(12) United States Patent
Jacobs et al.

(10) Patent No.: US 7,850,140 B2
(45) Date of Patent: Dec. 14, 2010

(54) CLAMPING MEMBER

(75) Inventors: Tom Jacobs, Horton, MI (US); Jason Whipple, Jackson, MI (US); Terry Butters, Jackson, MI (US)

(73) Assignee: Max Manufacturing, Jackson, MI (US)

( * ) Notice: Subject to any disclaimer, the term of this patent is extended or adjusted under 35 U.S.C. 154(b) by 675 days.

(21) Appl. No.: 11/406,946

(22) Filed: Apr. 19, 2006

(65) Prior Publication Data

US 2007/0248420 A1   Oct. 25, 2007

(51) Int. Cl.
*F02B 3/00* (2006.01)
(52) U.S. Cl. .............. 248/689; 248/226.11; 248/230.1; 405/218
(58) Field of Classification Search .......... 248/689, 248/226.11, 228.1, 230.1, 230.7, 231.85; 405/218
See application file for complete search history.

(56) References Cited

U.S. PATENT DOCUMENTS

| | | | | |
|---|---|---|---|---|
| 2,571,337 A | | 10/1951 | Burnham ..................... 61/48 |
| 3,449,002 A | | 6/1969 | Bernard ................... 287/52.03 |
| 4,050,257 A | | 9/1977 | Parks et al. ................... 61/48 |
| 4,074,537 A | | 2/1978 | Gronlie ........................ 61/48 |
| 4,464,074 A | | 8/1984 | Green et al. ................ 403/192 |
| 4,615,278 A | * | 10/1986 | Cabrelli ..................... 108/192 |
| 4,619,545 A | | 10/1986 | Kittenbaum ............... 403/169 |
| 4,901,970 A | | 2/1990 | Moss et al. ................. 248/514 |
| 5,184,911 A | * | 2/1993 | Wu ........................... 403/385 |
| 5,785,447 A | * | 7/1998 | Fonti et al. .................... 403/49 |
| 5,788,416 A | | 8/1998 | Wolgamot ................... 405/218 |
| 5,881,606 A | | 3/1999 | Roddy ....................... 74/551.3 |
| 6,095,466 A | * | 8/2000 | Sener et al. .............. 248/231.61 |
| 6,308,384 B1 | * | 10/2001 | Normal et al. ................. 24/277 |
| 6,341,764 B1 | * | 1/2002 | Conner ..................... 256/65.12 |
| 6,342,138 B1 | * | 1/2002 | Brown ...................... 204/297.09 |
| 6,575,652 B2 | * | 6/2003 | Krauss ........................ 403/49 |

* cited by examiner

*Primary Examiner*—Terrell McKinnon
*Assistant Examiner*—Steven M Marsh
(74) *Attorney, Agent, or Firm*—Young Basile (57) ABSTRACT

An improved clamping mechanism for clamping a dock support frame having a hollow recess and a U-shaped cut-out to a vertical support member has an anvil clamping member comprised of extruded aluminum. The anvil clamping member has an arc-shaped clamping surface and is fixedly disposed inside the hollow recess in the support frame. A hammer clamping member comprised of extruded aluminum and having a corresponding arc-shaped clamping surface is adjustably attached to the anvil clamping member such that the vertical support member can pass between the hammer clamping member and the anvil clamping member and through the U-shaped cut-out of the support frame. By this arrangement, the arc-shaped clamping surface of the anvil member and the corresponding arc-shaped clamping surface of the hammer clamping member together clamp together to make a friction connection with the vertical support member so the vertical support member can hold the dock support member above a waterline allowing the dock support member to support a dock structure member above the waterline an anvil clamping member comprised of extruded aluminum and having an arc-shaped clamping surface.

9 Claims, 9 Drawing Sheets

CLAMPING MEMBER

FIELD OF THE INVENTION

The present invention relates to clamping systems spreaders and more particularly to clamping systems to support dock frame systems. The extruded aluminum clamping system provides superior clamping strength providing great flexibility in how an assembly would set up a docking system. In addition, the clamping system of the present is easier to assemble and provides greater torsional stability than the clamping systems of the prior art

BACKGROUND OF THE INVENTION

Many lakes in the upper Mid-west are used for summer recreation activities like swimming, boating, fishing and sunning. Docks on these lakes help facilitate these summer activities. However, many (if not most) of these lakes are covered by ice in the winter. This ice can damage a dock, so most dock owners remove their docks in the fall and reinstall their docks the next spring/early summer.

For ease of installation, most of these removable docks are modular—having vertical support legs that support frame members upon which sections of docking material rest. Modular docks using aluminum support legs and aluminum frames are well known and have been in use for years. Aluminum provides many advantages over other docking materials such as wood and steel. Aluminum does not corrode like steel, nor does it rot like wood.

Providing a clamping system so the support legs can properly support the frame members has been difficult, however. Most existing docks clamp the frame to a tubular support leg by inserting the tubular support leg through a somewhat larger cast aluminum tube that is fixedly attached to the frame member. A tightened set screw prevents vertical movement of the tubular support frame leg. Examples of such systems are disclosed in U.S. Pat. Nos. 2,571,337, 3,345,825, and 4,074,537.

Figure 10:
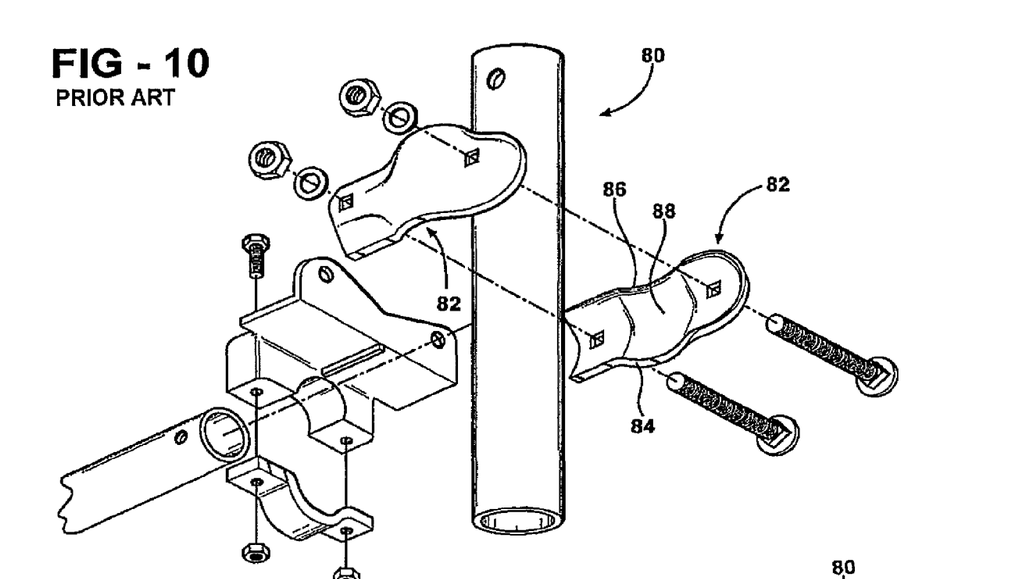
FIG. 10 is an exploded perspective view of a prior art clamping systems using a common cast aluminum clamp member.

These "set screw" systems did not provide an abundance of frictional force. Therefore, if one wanted a dock to hold a heavy load one had to provide numerous support legs. In an attempt to overcome this limitation, dock owners began to use cast aluminum clamping system consisting of two cast aluminum c-clamp sections held together by a pair of bolts and nuts. Such a system is shown in FIG. 10. To assembly such a system, as shown in FIG. 10, one would put the tubular support leg into the open "c" section of the first cast aluminum c-clamp section, which is fixedly attached to the frame member. The second cast aluminum c-clamp section would then be placed on the opposite side of the tubular support leg from the first cast aluminum c-clamp section and the two cast aluminum c-clamp sections would be tightened onto the tubular support leg using a pair of bolts and nuts.

Figure 11:
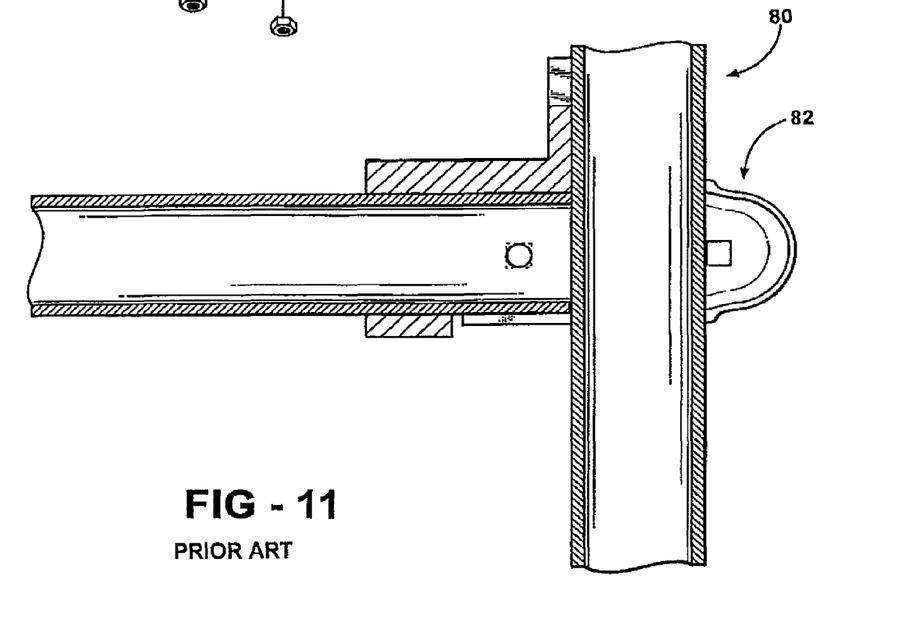
FIG. 11 is a side cut-away view of a prior art clamping systems using a common cast aluminum clamp member

Cast aluminum clamping systems of this sort, while providing more support than the "set screw" clamping systems, still do not provide an abundance of vertical support since the cast aluminum c-clamp sections do not grip the support leg with the entire interior face of the "c" sections—they only grip with the upper and lower portions of the "c" sections as shown in FIGS. 10 and 11. Also, cast aluminum is brittle and can easily crack if a dock owner tightens the nuts and bolts too much—an event that commonly occurs when a dock owner wants to provide more frictional vertical support from the clamping system. Finally, these cast aluminum clamping systems are difficult to install. An installer must use one hand to hold the frame member and the other hand to install the second c-clamp section and tighten the nuts and bolts. Often it takes at least two people to install such a cast-aluminum clamping system. Such cast aluminum clamping systems (as well as the "set screw" clamping systems) used in a modular decking system do not provide a high degree of torsional stability (i.e. there is "play" in the system). Such "play" makes a modular deck system less secure (both in actuality as well as in feeling) when bearing loads.

SUMMARY OF THE INVENTION

It is an object of the present invention to provide an improved clamping system for a modular dock using extruded aluminum clamping members to provide a greater strength clamping system. Extruded aluminum is stronger and more flexible than cast aluminum. In addition, the extruded aluminum clamping members can be extruded to allow more clamping surface area which, in turn, allows each clamping system to provide support to more weight from a frame member (and, therefore, more weight from a deck surface).

It is a further object of the present invention to provide improved clamping system for a modular dock using extruded aluminum clamping members to provide for improved ease of assembly. By using the frame member to hold the clamping members in place and by providing threaded holes within the interior clamping member, one assembler can assembly the framing system using only two hands instead of the three or four hands from two assemblers the current products require.

It is yet a further object of the present invention to provide improved clamping system for a modular dock using extruded aluminum clamping members to provide greater torsional stability by providing a higher load bearing and greater torsional strength clamping system.

In one illustrative embodiment of the present invention the improved clamping mechanism for clamping a support frame to a support member has an anvil clamping member comprised of extruded aluminum fixedly disposed inside a hollow recess in the support frame. A hammer clamping member comprised of extruded aluminum adjustably attached to the anvil clamping member so that the hammer clamping member and the anvil clamping member together clamp together to make a friction connection with the support member.

In another feature of the illustrative embodiment of the present invention the improved clamping mechanism for clamping a support frame having a hollow recess and a U-shaped cut-out to a support member has an anvil clamping member comprised of extruded aluminum. The anvil clamping member has an arc-shaped clamping surface and is fixedly disposed inside the hollow recess in the support frame. A hammer clamping member comprised of extruded aluminum and having a corresponding arc-shaped clamping surface is adjustably attached to the anvil clamping member such that the support member can pass between the hammer clamping member and the anvil clamping member and through the U-shaped cut-out of the support frame. By this arrangement, the arc-shaped clamping surface of the anvil member and the corresponding arc-shaped clamping surface of the hammer clamping member together clamp together to make a friction connection with the support member.

In yet another feature of the illustrative embodiment of the present invention the Unproved clamping mechanism for clamping a dock support frame having a hollow recess and a U-shaped cut-out to a vertical support member has an anvil clamping member comprised of extruded aluminum. The anvil clamping member has an arc-shaped clamping surface and is fixedly disposed inside the hollow recess in the support frame. A hammer clamping member comprised of extruded aluminum and having a corresponding arc-shaped clamping surface is adjustably attached to the anvil clamping member such that the vertical support member can pass between the hammer clamping member and the anvil clamping member and through the U-shaped cut-out of the support frame. By this arrangement, the arc-shaped clamping surface of the anvil member and the corresponding arc-shaped clamping surface of the hammer clamping member together clamp together to make a friction connection with the vertical support member so the vertical support member can hold the dock support member above a waterline allowing the dock support member to support a dock structure member above the waterline an anvil clamping member comprised of extruded aluminum and having an arc-shaped clamping surface.

Other advantages and embodiments of the present invention will become more apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

The following descriptions are of an exemplary embodiment only, and are not intended to limit the scope, application of configuration of the invention in any way. Rather, the following descriptions provide a convenient illustration for implementing exemplary embodiments of the invention. Various changes to the described embodiment may be made in the function and arrangement of the elements described without departing from the scope of the invention as set forth in the claims.

Figure 1:
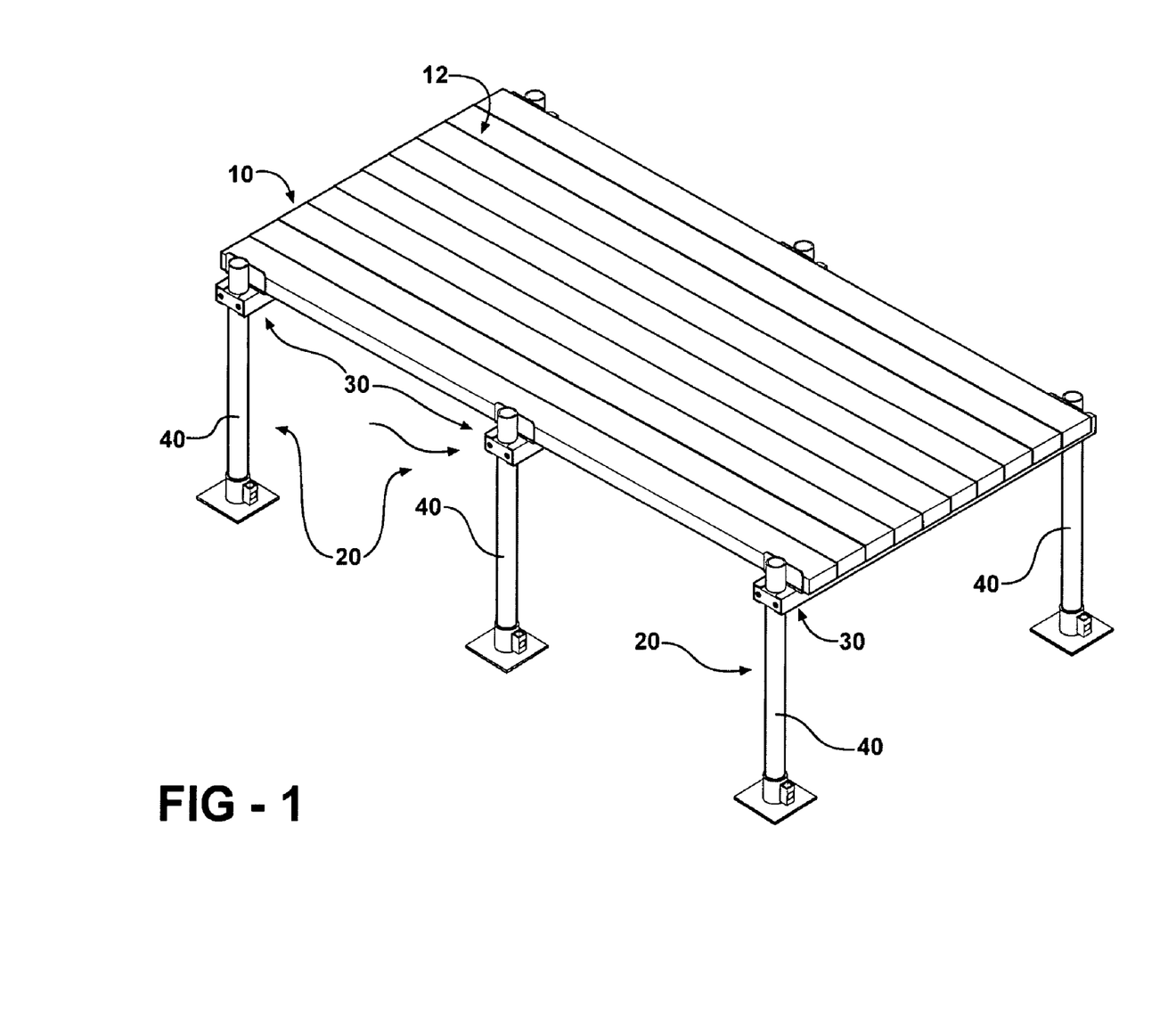
FIG. 1 is a perspective view of a docking system having a single docking platform with a support frame system using an improved clamping mechanism 50 of the present invention.
Figure 2:
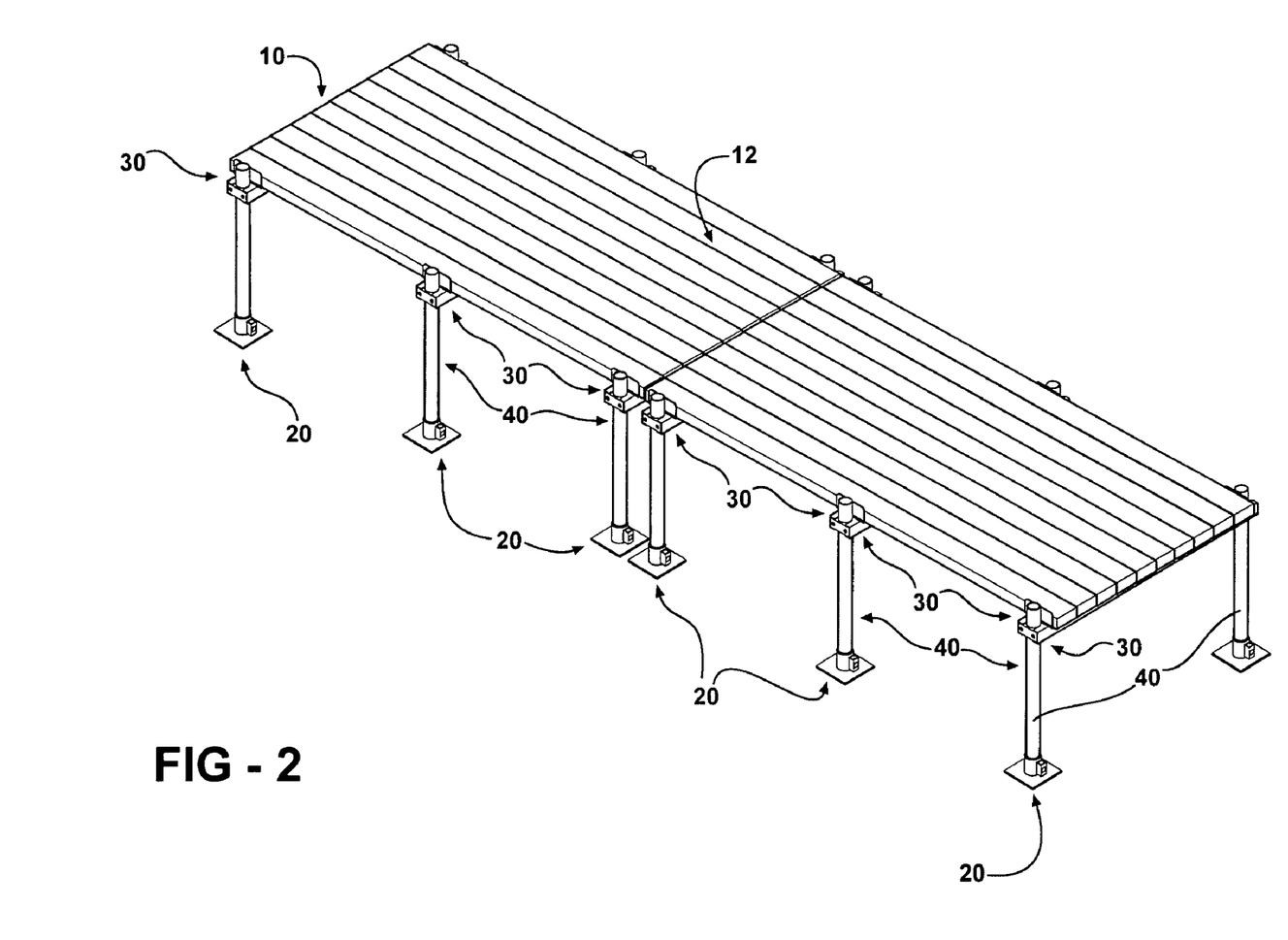
FIG. 2 is a perspective view of a docking system having multiple docking platforms aligned linearly, each docking platform being supported by a support frame system using an improved clamping mechanism of the present invention.
Figure 3:
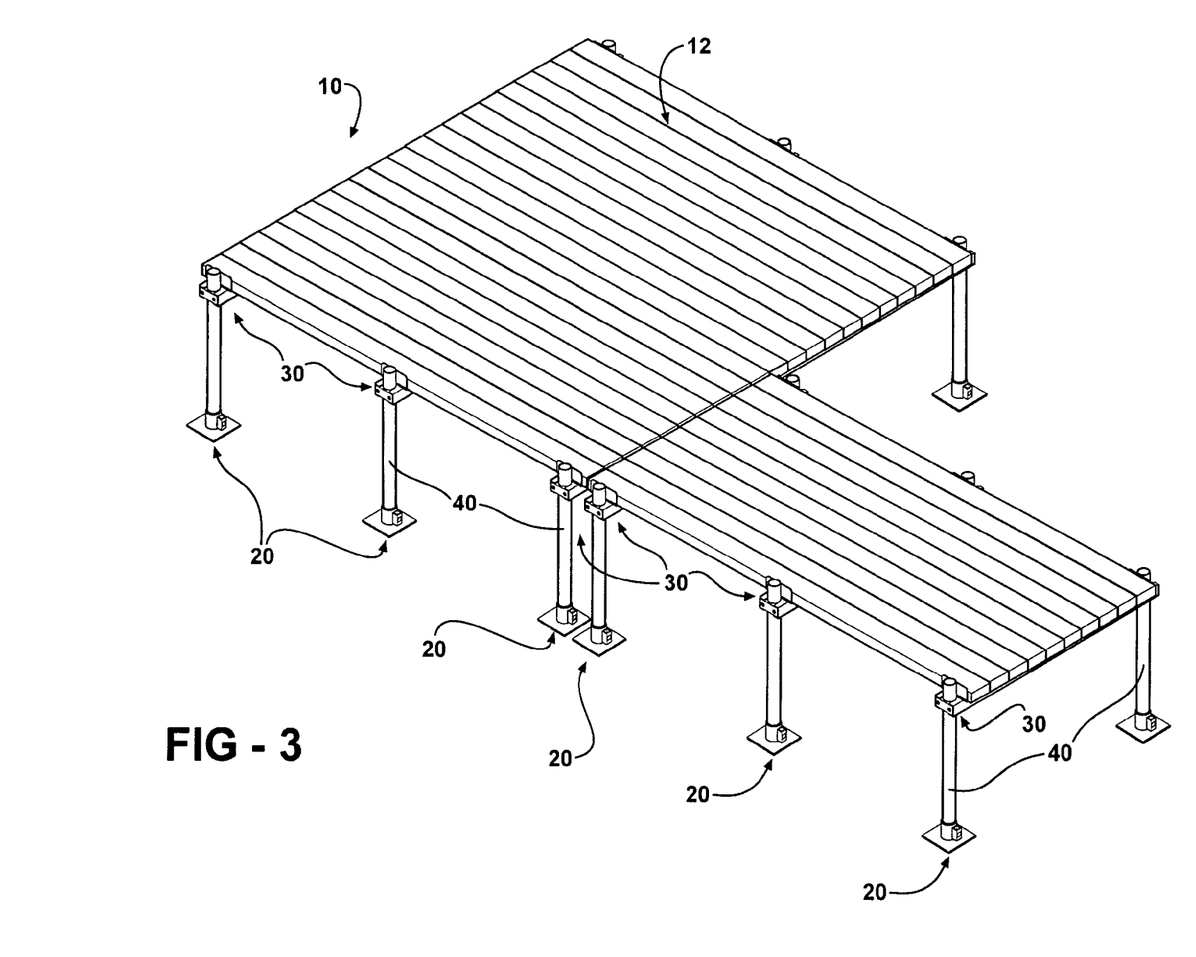
FIG. 3 is a perspective view of docking system having multiple docking platforms aligned both linearly and side-to-side, the docking platforms being supported by a support frame system using an improved clamping mechanism of the present invention.

Referring to FIG. 1, there is shown docking system 10 with a support frame system 20 using an improved clamping mechanism 50 of the present invention. The support frame system 20 includes at least one support frame 30 of extruded aluminum that supports the dock platform 12, though there may be many support frames 30 holding up each dock platform 12, or multiple dock platforms 12 (as shown in FIG. 2 and 3). The support frames 30 are hollow and usually have a rectangular cross section to provide a flat surface 32 on which a dock platform 12 can rest. The support frames 30 also have U-shaped cut-outs 34 at each end. Each support frame 30 preferably has a pair of stringer brackets 36 of extruded aluminum to which the dock platform is attached by bolts, screws or other attachment means. The stringer brackets 36 are usually welded to the support frame 30. The dock platform 12 is thus prevented from moving laterally or vertically in relation to the support frame 30.

Figure 4A:
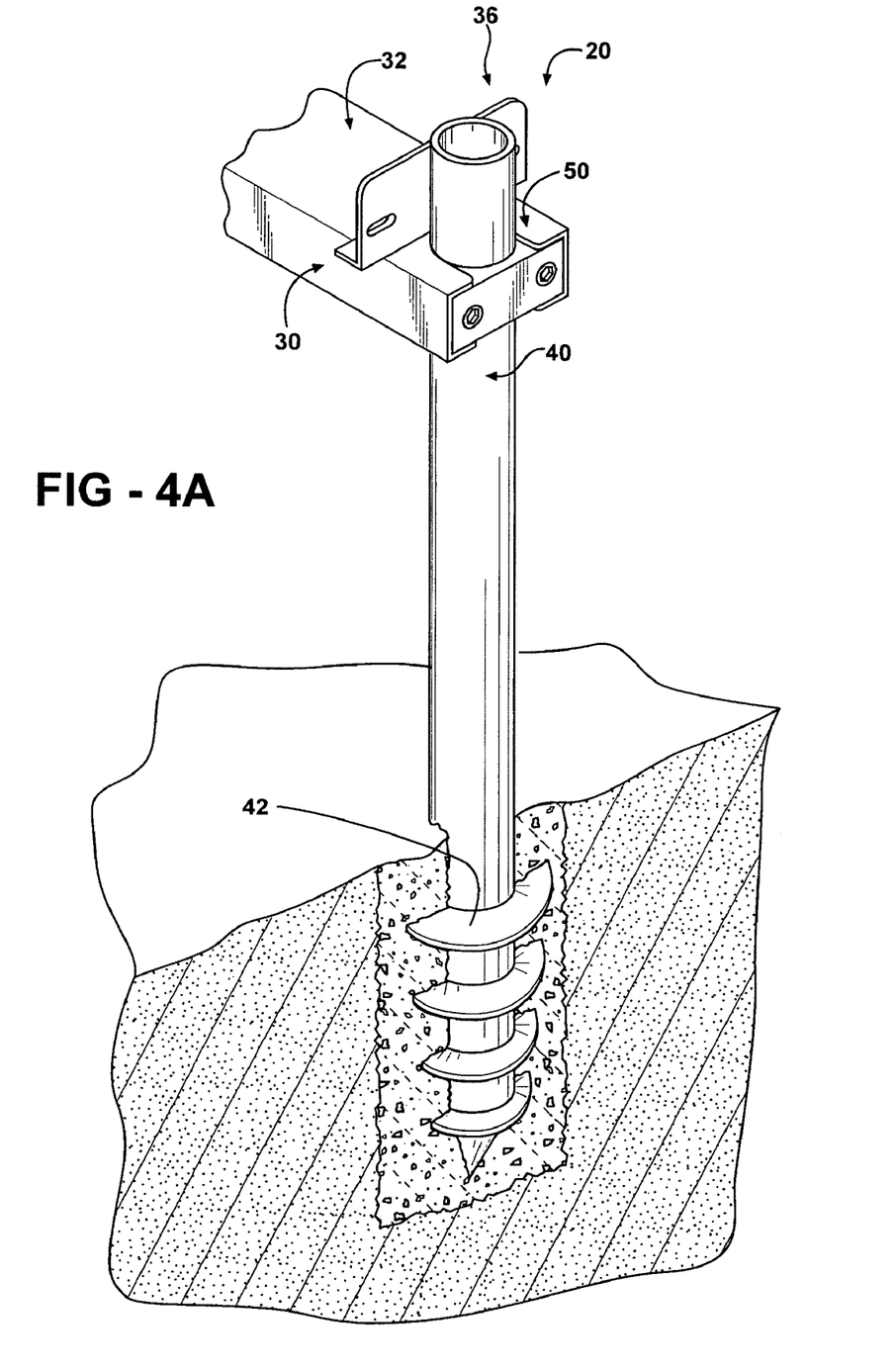
FIG. 4a is a perspective view of a vertical support member using an auger to auger into the lake bed.
Figure 4B:
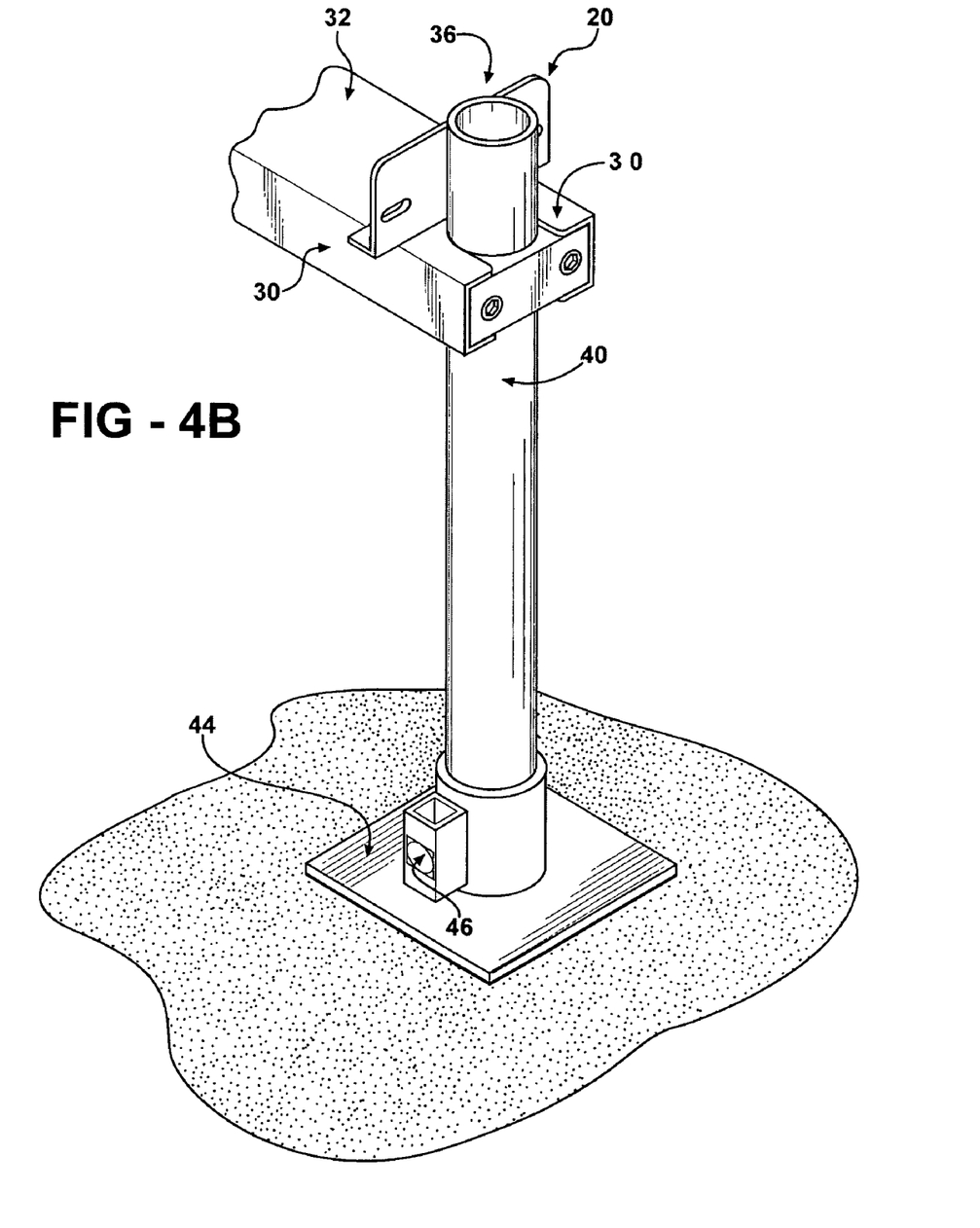
FIG. 4b is a perspective view of a vertical support member using a base plate which in turn sits on the lake bed.
Figure 9:
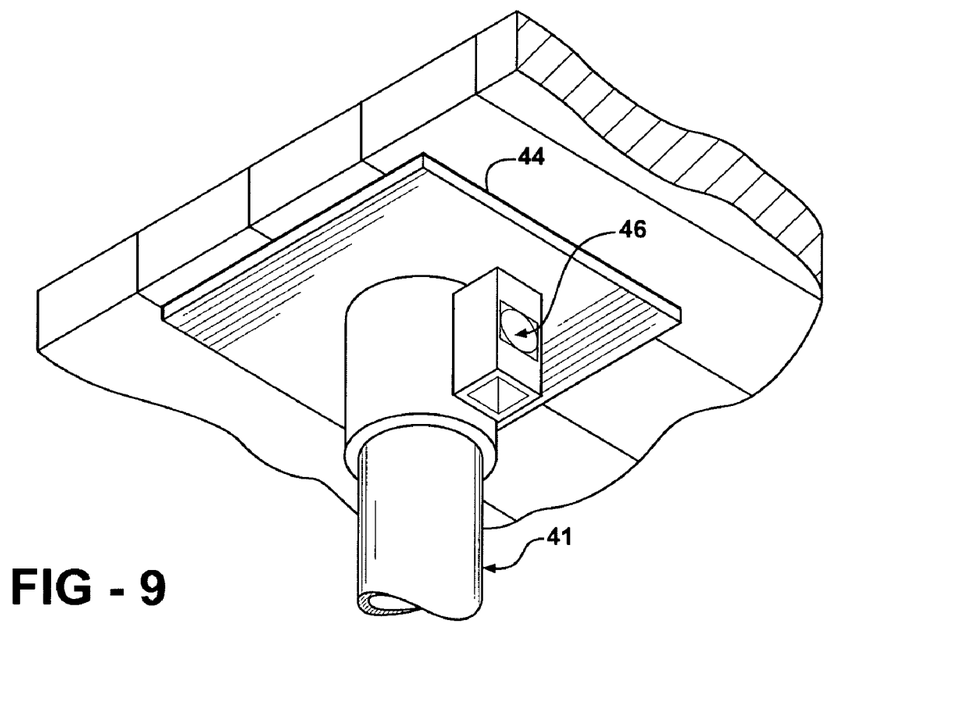
FIG. 9 is a perspective view of the bottom of a support member with a base plate welded thereto to accept the top of a vertical support member.

A pair of extruded aluminum vertical support members 40 holds the support frame 30, and hence the dock platform 12, out of the water using the improved clamping mechanism 50 as described below. (For purposes of this illustration it is assumed the docking system will be used in a lake, though it can be used in any body of water). The vertical support member 40 either uses an auger 42 to auger into the lake bed, FIG. 4a, or fits into a base plate 44 held in place by a set screw or bolt 46, which in turn sits on the lake bed, FIG. 4b. The vertical support member 40 is usually a tube with a circular cross section through it could have any shaped cross section. The vertical support member 40 should be sized so it can fit into the U-shaped cut-out 34 at the end of the support frame. A docking arrangement as shown in FIG. 3 with multiple docking platforms 12 side-by-side may require vertical support from a middle vertical support member 41 (shown in FIG. 9) to be positioned between the pair of vertical support members 40 to prevent the dock sections 12 from sagging. This middle vertical support member 41 can be held in place by a base plate 44 welded to the bottom of the support frame 30. This middle support member 41 prevents any sagging of the support frame 30 and the dock platforms 12.

Figures 5, 7:
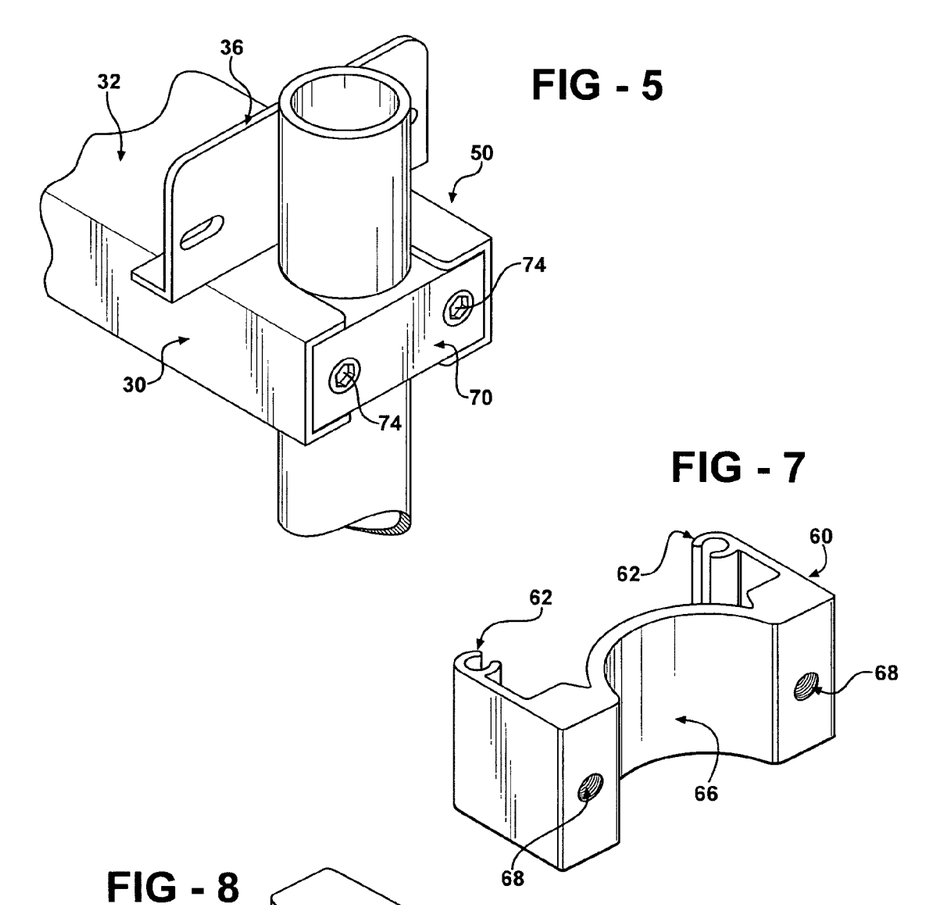
FIG. 5 is a perspective view of a support frame system using an improved clamping mechanism of the present invention to hold a support frame on a vertical support member.
FIG. 7 is a perspective view of an extruded aluminum anvil clamping member 60 of the improved clamping mechanism of the present invention.
Figure 6:
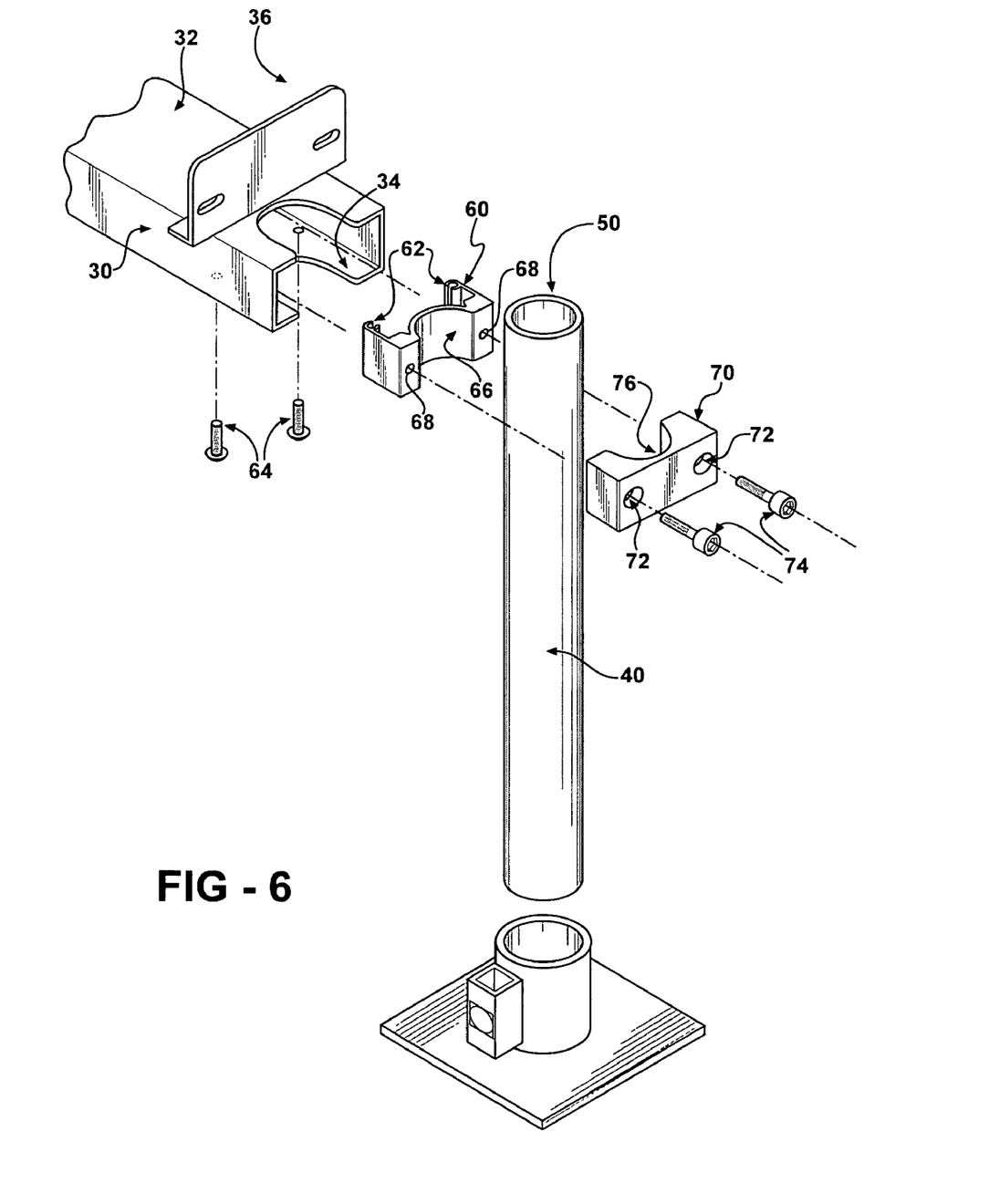
FIG. 6 is an exploded perspective view of the improved clamping mechanism of the present invention that can hold a support frame on a vertical support member.
Figure 8:
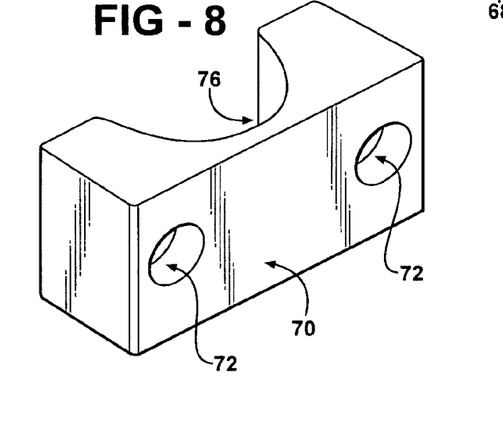
FIG. 8 is a perspective view of an extruded aluminum hammer clamping member 60 of the improved clamping mechanism of the present invention.

The improved clamping mechanism 50 includes an extruded aluminum anvil clamping member 60 (shown in FIG. 5 and an extruded aluminum hammer clamping member 70 (shown in FIGS. 5 and 7). The anvil clamping member 50 has two threaded slots 62 and fits inside of support frame 30. Screws or bolts 64 pass through holes 38 in the support frame 30 and thread in the threaded slots 62, securing the anvil clamping member 60 inside the support frame 30. Each anvil clamping member 60 has an arc-shaped clamping surface 66 that has substantially the same radius of curvature as does the tubular vertical support member 40 (or in the case of a non-tubular vertical support member 40 has a shape substantially the same and sized to fit the vertical support member 40). Each anvil clamping member 60 also has a pair of threaded holes 68.

The hammer clamping member 70 also has an arc-shaped clamping surface 76 that has substantially the same radius of curvature as does the tubular vertical support member 40 (or in the case of a non-tubular vertical support member 40 has a shape substantially the same and sized to fit the vertical support member 40). In addition, the hammer clamping member 70 has two non-threaded holes 72. When placed in a position to form the clamping mechanism 50, the non-threaded holes 72 of the hammer clamping member 70 align with the threaded holes 68 of the anvil clamping member 60. Bolts 74 pass through the non-threaded holes 72 of the hammer clamping member 70 and thread into the threaded holes 68 of the anvil clamping member 60. As these bolts 74 tighten, the hammer clamping member 70 moves closer to the anvil clamping member 60, bringing the arc-shaped clamping surfaces 66 and 76 into tight contact with the vertical support member 40.

The tighter the bolts 74 tighten, the more frictional clamping force the arc-shaped clamping surfaces 66 and 76 apply to the vertical support member 40. The bolts 74 can tighten the extruded aluminum hammer clamping member 70 and anvil clamping member 60 tighter than would be possible if the two clamping members 60 and 70 were made of cast aluminum. This is because extruded aluminum is stronger and more flexible than is cast aluminum. A tighter fit means the arc-shaped clamping surfaces 66 and 76 can apply more frictional force so the clamping mechanism can hold a heavier load than it could if it was made of cast aluminum. In addition, the arc-shaped clamping surfaces 66 and 76 of the extruded aluminum hammer clamping member 70 and anvil clamping member 60 has a larger surface area than do most of the prior art cast aluminum clamps 80. FIGS. 10 and 11 show a design for a common cast aluminum clamp member 82 which has clamping surfaces 84 and 86. However the casting process leaves a gap 88 where there is no clamping surface. So, not only did the prior art cast aluminum clamps have less clamping force, and therefore less frictional force, they also had less surface area over which this frictional force could clamp a vertical support member 40. This combination meant that the prior art cast aluminum clamps could support much less weight than can the improved clamping mechanism 50 of the present invention.

The added strength of each of the improved clamping mechanisms 50 of the present invention also provides greater torsional stability to the entire docking assembly 10. It also allows for a modular docking arrangement. In prior art docking systems each frame assembly could only hold one dock platform. The prior art clamps 80 could not hold sufficient weight to hold multiple docking platforms on one frame support 94. With the improved clamping mechanism 50, however, a user can arrange his dock in multiple ways, as each support frame 30 can be long enough to hold two dock platforms 12 side-by-side as shown in FIG. 3. This allows a dock owner greater flexibility in how he wants to set up his dock. Depending on the load distribution on the dock platforms 12 a user may want to weld a base plate 44 into which the top of a vertical support member 40 may fit to prevent bowing of the middle of the support frame 30 and resulting bowing of the middle of the dock platforms 12.

The improved clamping mechanisms 50 of the present invention also makes the dock assemblies 12 easier to assemble than the prior art dock systems 90 using the prior art cast aluminum clamps 80. With the improved clamping mechanisms, an assembler can use one hand to hold the support frame 30 and the other hand to hold the hamper clamping member 70. The anvil clamping member 60 is already secured within the support frame 30 and has threads to receive the bolts 74 so no nuts are needed for assembly. Once an assembler has inserted the bolts 74 he no longer needs to hold the hammer clamping mechanism 70 in place, leaving him a hand free to tighten the bolts 74.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for use in attaching a boat dock platform to a substantially vertical support post, the apparatus comprising:
    an elongate dock frame member having an internal recess along a longitudinal axis of the frame member terminating at an open end in communication with the recess;
    a support post having a contact surface about an outer periphery of the post and a longitudinal length;
    an anvil clamp member positioned substantially within the frame member recess adjacent the open end and connected to the frame member, the anvil having a contact surface configured for engaging receipt of a portion of the post contact surface; and
    a hammer clamp member at least partially positioned within the frame member recess housing the anvil to substantially close the frame member open end, the hammer clamp member having a contact surface opposing the anvil contact surface, the hammer contact surface configured for engaging receipt of a portion of the post contact surface, the hammer operable to engage the anvil to provide a clamping force between the anvil contact surface and the hammer contact surface against the post contact surface to frictionally engage the dock frame member to the support post.

2. The apparatus of claim 1 wherein the frictional engagement of the anvil contact surface and the hammer contact surface against the post contact surface is the sole connection of the dock frame member to the support post.

3. The apparatus of claim 2 wherein substantially all of the anvil contact surface and the hammer contact surfaces are in frictional contact with the post contact surface when the hammer is fully engaged with the anvil.

4. The apparatus of claim 1 wherein the frame member defines a through channel at the open end substantially perpendicular to the frame longitudinal axis, the channel configured for surrounding and abutting engagement of the frame member with a portion of the post outer periphery, the anvil contact surface positioned in alignment with the through channel.

5. The apparatus of claim 1 further comprising a stringer bracket connected to the frame member for abutting engagement with a portion of the post outer periphery when the post is positioned in the frame through channel.

6. The apparatus of claim 1 wherein operable engagement of the hammer to the anvil comprises at least two fasteners positioned through the hammer on opposing sides of the post periphery for threading engagement with the anvil, wherein tightening of the fasteners increases the clamping force between the anvil and the hammer contact surfaces against the post contact surface.

7. The apparatus of claim 1 wherein the frame member can be clamped to the post in unlimited positions about the post periphery along a length of the post.

8. The apparatus of claim 1 wherein the frame member, the anvil and the hammer are made from extruded aluminum.

9. An apparatus for use in attaching a boat dock platform to a vertical support post, the apparatus comprising:

- a closed-top section elongate dock frame member having an elongate internal recess along a longitudinal length of the frame member, the frame member terminating at an open end in communication with the recess, the frame member further having a through channel at the open end perpendicular to the frame member longitudinal length;
- a vertical support post having a contact surface about an outer periphery of the post extending along a length of the post, the post positioned to extend through the frame member through channel;
- a unitary anvil clamp member positioned completely within the recess and enclosed by the frame member adjacent the open end and fixedly connected to the frame member, the anvil having a contact surface in alignment with the frame member through opening and is configured for engaging receipt of a portion of the post contact surface; and
- a hammer clamp member positioned substantially within the frame member recess housing the anvil along the frame member longitudinal length to close the open end of the frame member recess, the hammer clamp member having a contact surface opposing the anvil contact surface, the hammer contact surface configured for engaging receipt of a portion of the post contact surface, the hammer having means for engaging the anvil to provide an adjustable clamping force between the anvil contact surface and the hammer contact surface against the post contact surface to frictionally engage the dock frame member to the support post, wherein the frictional engagement by the anvil contact surface and the hammer contact surface against the post contact surface is the sole connection between the post and the dock frame member without piercing the outer periphery of the support post.

* * * * *